(12) United States Patent
Miyazaki et al.

(10) Patent No.: US 7,499,100 B2
(45) Date of Patent: Mar. 3, 2009

(54) STRUCTURE FOR ATTACHING STEREOSCOPIC CAMERA IN VEHICLE

(75) Inventors: Yasuaki Miyazaki, Utsunomiya (JP);
Hiroshi Hattori, Utsunomiya (JP);
Masahito Watanabe, Utsunomiya (JP);
Yoshitaka Katashima, Utsunomiya (JP);
Nobuharu Nagaoka, Nasu-gun (JP);
Kazuhiko Iwaizako, Utsunomiya (JP);
Hiromichi Tsushima, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 556 days.

(21) Appl. No.: 11/243,206

(22) Filed: Oct. 4, 2005

(65) Prior Publication Data

US 2006/0072008 A1  Apr. 6, 2006

(30) Foreign Application Priority Data

Oct. 6, 2004  (JP)  ............................. 2004-293575
Oct. 6, 2004  (JP)  ............................. 2004-293639

(51) Int. Cl.
*H04N 5/225* (2006.01)
*H04N 13/00* (2006.01)
*B60R 19/54* (2006.01)
*G08G 1/017* (2006.01)
*G08G 1/054* (2006.01)
*F16M 11/04* (2006.01)
*A47B 97/00* (2006.01)

(52) U.S. Cl. ......................... 348/373; 280/762; 348/42; 340/937; 248/187.1; 248/503

(58) Field of Classification Search ................. 348/42, 348/373, 375, 376; 280/762; 248/187.1, 248/503; 340/937
See application file for complete search history.

(56) References Cited

U.S. PATENT DOCUMENTS

| 4,277,804 A | 7/1981 | Robison |
| 2002/0125383 A1* | 9/2002 | Takahashi ................... 248/200 |
| 2004/0208497 A1 | 10/2004 | Seger et al. |
| 2006/0072917 A1* | 4/2006 | Miyazaki et al. ............ 396/325 |

FOREIGN PATENT DOCUMENTS

| DE | 101 62 652 A1 | 7/2003 |
| EP | 1 086 859 A1 | 3/2001 |
| JP | 11-301365 | 11/1999 |

(Continued)

*Primary Examiner*—Tuan V Ho
*Assistant Examiner*—Chia-Wei A Chen
(74) *Attorney, Agent, or Firm*—Carrier, Blackman & Associates, P.C.; William D. Blackman; Joseph P. Carrier (57) ABSTRACT

A structure for attaching a stereoscopic camera in a vehicle allows a plurality of cameras to be attached to a vehicle body frame, in order to stereoscopically capture images surrounding the vehicle. The structure includes: a lateral stay for coupling the plurality of cameras with each other; and brackets for fixing the lateral stay or the plurality of cameras at a cross member having both ends folded upward, having the terminals connected to the front end parts of the side frames at both sides of the engine room, and having a radiator supported at the middle part thereof, wherein at least a part of the plurality of cameras is disposed between both the ends of the cross member and the radiator.

10 Claims, 10 Drawing Sheets

FOREIGN PATENT DOCUMENTS

| | | |
|---|---|---|
| JP | 2001-058580 | 3/2001 |
| JP | 2001-088623 | 4/2001 |
| JP | 2001-158284 | 6/2001 |
| JP | 2001-233139 | 8/2001 |
| JP | 2002-264743 | 9/2002 |
| JP | 2003-175767 | 6/2003 |
| JP | 2004-032793 | 1/2004 |

* cited by examiner

STRUCTURE FOR ATTACHING STEREOSCOPIC CAMERA IN VEHICLE

BACKGROUND OF THE INVENTION

1. Field of the Invention

The present invention relates to a structure for attaching a camera mounted in a vehicle, and in particular it relates to a structure for attaching a stereoscopic camera in a vehicle by which a plurality of cameras can be attached to a body frame of the vehicle in order to stereoscopically capture images surrounding the vehicle.

Priority is claimed on Japanese Patent Application No. 2004-293575, filed on Oct. 6, 2004, and on Japanese Patent Application No. 2004-293639, filed on Oct. 6, 2004, the contents of which are incorporated herein by reference.

2. Description of Related Art

Such a technology has been developed, which captures the images surrounding a vehicle while the vehicle is running and when it stops and utilizes the image information for traveling support, etc. As one of the representative technologies, a stereoscopic camera technology is known which stereoscopically recognizes the surrounding images on the basis of images captured by two cameras and grasps the positional relationship in front of and behind an object.

In such a structure for attaching a stereoscopic camera, two cameras are attached one on each end of a horizontally long lateral stay in order to prevent the optical axes of both cameras from deviating due to a distortion of a body of the vehicle, and only the middle part of the lateral stay is fixed in the body (For example, refer to Japanese Unexamined Patent Application, First Publication No. 2001-88623).

However, in a case when an infrared camera which handles light that is difficult to pass through windshields is used for the stereoscopic camera, it has been recently considered that the camera be disposed at the front grille forward of the engine room. However, since a radiator is installed in the vicinity of the front grille, there is a concern that the camera will hinder the radiator from taking in air if the camera is installed at the front grille. In addition, the camera is apt to be affected by heat emitted from the radiator.

Also, since heavy devices such as an engine, transmission, etc., are incorporated on a body frame at the front of the engine room, the front part of the vehicle is slightly lowered. Further, the degree of lowering differs between the left side and the right side of a vehicle, resulting from the disposition, etc., of such heavy devices. Therefore, when the camera is installed on the body frame at the front of the engine room, it is considered that the photographing area of the camera should be made large in advance, captured images are subjected to image processing and adjusted, and a mechanism for mechanically adjusting the optical axis is provided.

Actually, however, when image processing is carried out, in line with securing a large photographing area for the camera, an increase in production costs thereof results therefrom, and it is necessary to increase the size of the camera. In a case when a mechanical optical axis adjusting mechanism is provided, the structure of the adjusting mechanism is complex, which is inconvenient since the weight and the production costs are increased.

SUMMARY OF THE INVENTION

The present invention provides a structure for attaching a stereoscopic camera in a vehicle which does not result in a lowering in the cooling performance of a radiator or in any adverse influence on the camera due to heat generated by the radiator, even when the camera is installed at the front grille.

Also, the invention provides a structure for attaching a stereoscopic camera, the structure being capable of eliminating a deviation in the optical axis of the camera without resulting in any inconveniences such as increasing the production costs, the size of camera, and the vehicle weight, etc.

A structure for attaching a stereoscopic camera according to the invention allows a plurality of cameras to be attached on the body frame in order to stereoscopically capture the images surrounding the vehicle, and the same structure includes: a lateral stay for coupling the plurality of cameras with each other; and brackets for fixing the lateral stay or the plurality of cameras at a cross member having both ends folded upward, having the terminals connected to the front end parts of the side frames at both sides of the engine room, and having a radiator supported at the middle part thereof, wherein at least a part of the plurality of cameras is disposed between both ends of the cross member and the radiator.

Further, another structure for attaching a stereoscopic camera in a vehicle according to the invention allows a plurality of cameras to be attached on the body frame in order to stereoscopically capture the images surrounding the vehicle, and the same structure includes: a lateral stay for coupling the plurality of cameras with each other; and brackets for fixing the lateral stay or the plurality of cameras at a cross member having both ends folded upward, having the terminals connected to the front end parts of the side frames at both sides of the engine room, and having a radiator supported at the middle part thereof, wherein at least a part of the plurality of cameras is disposed in the vicinity of the outside of the side frames at both folded ends of the cross member.

In the invention, at least a part of a plurality of cameras is disposed in an offset state forward of a radiator. Further, the cameras are fixed on the cross member in the vicinity of the side frame, which is a major framework member of the vehicle.

According to the invention, since at least a part of a plurality of cameras is offset forward of the radiator, it is possible to prevent the cooling performance of the radiator from being lowered due to the cameras. In addition, it becomes difficult for the cameras to be adversely influenced by heat of the radiator. Further, the cameras can be supported on the cross member in the vicinity of the side frames having high rigidity.

In the attaching structure of a stereoscopic camera for a vehicle according to the invention, it is preferable that a plane of the brackets to be attached to the lateral stay or an attaching plane of the brackets to each of the cameras be inclined to a plane of the brackets to be attached to the body frame so that the optical axis of the camera is inclined upward with respect to an axis orthogonal to the plane of the brackets to be attached to the body frame.

In the invention, since the plane of the brackets to be attached to the lateral stay or the attaching plane of the brackets to the camera is inclined to the plane of the brackets to be attached to the body frame, that is, to a plane to be attached to the vehicle body, the optical axis of the camera is oriented as targeted if the body frame is deformed so as to fall downward due to the weight of heavy devices. Therefore, it is possible to eliminate deviations of the optical axis of the camera without resulting in any inconveniences such as increasing the production costs, the size of the cameras, and the weight of the vehicle.

In the attaching structure of a stereoscopic camera for a vehicle according to the invention, it is preferable that an angle formed by the plane of the bracket to be attached to the lateral stay and the plane of the bracket to be attached to the body frame or an angle formed by the attaching plane of the bracket to the camera and the plane of the bracket to be attached to the body frame be established in response to an amount of displacement of the portion of the body frame where the bracket is installed.

In the invention, since the angle formed by the plane of the bracket to be attached to the lateral stay and the plane of the bracket to be attached to the body frame or the angle formed by the attaching plane of the bracket to the camera and the plane of the bracket to be attached to the body frame is established in response to the amount of displacement of the portion of the body frame where the bracket is installed, it is possible to individually set the optical axes of the cameras corresponding to a difference in the amount of partial deformation of the body frame. Therefore, even if the deformation amounts differ from each other at the left side and the right side, resulting from the disposition, etc., of heavy devices, the optical axes of the cameras can be oriented to a targeted angle without fail.

DETAILED DESCRIPTION OF THE INVENTION

A description is given of a first embodiment according to the invention with reference to FIG. 1 through FIG. 7.

Figure 1:
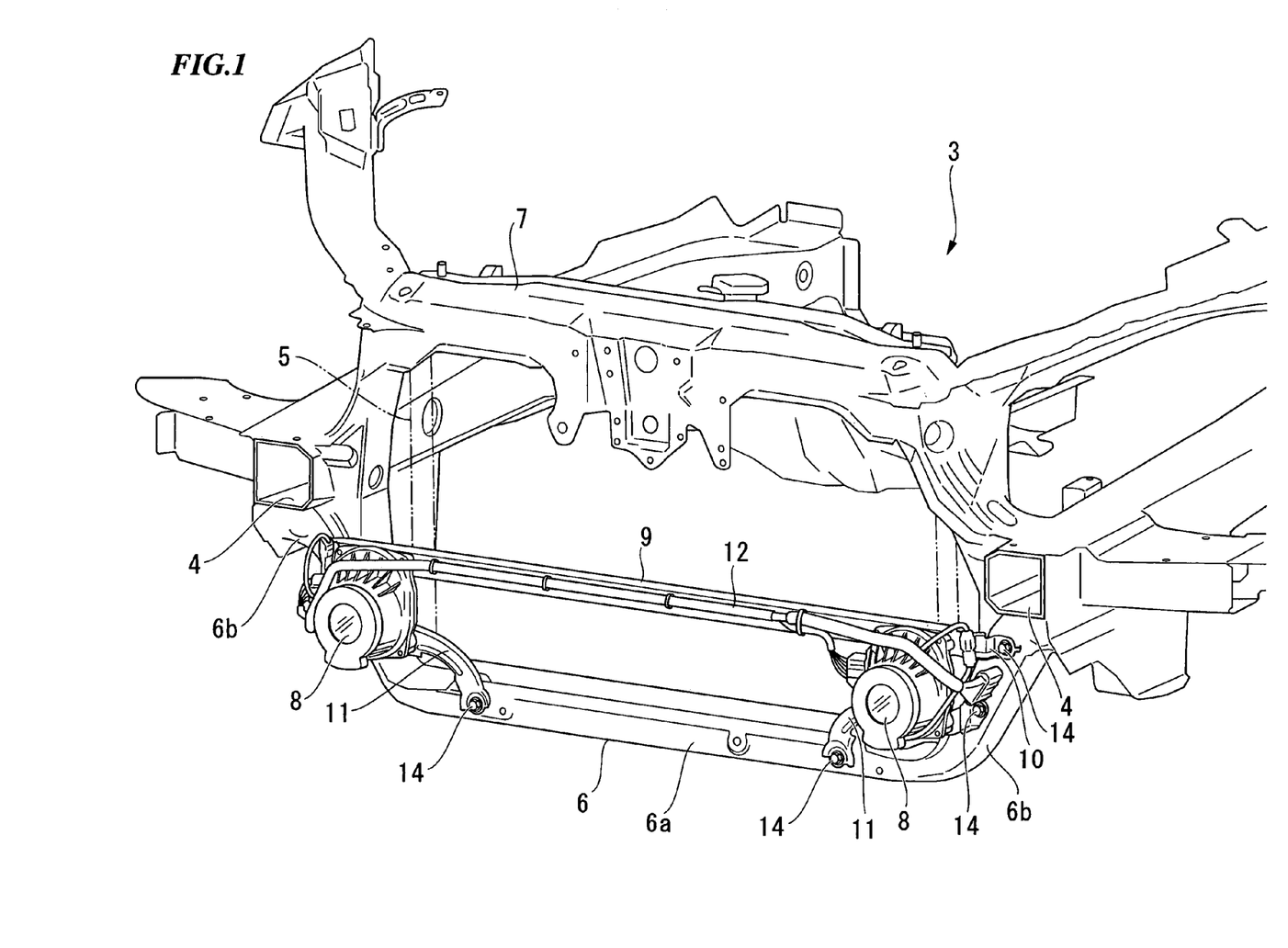
FIG. 1 is a perspective view showing a state where the framework of a vehicle body is exposed with the body panels and bumper, etc., removed from the front part of the vehicle body.
Figure 2:
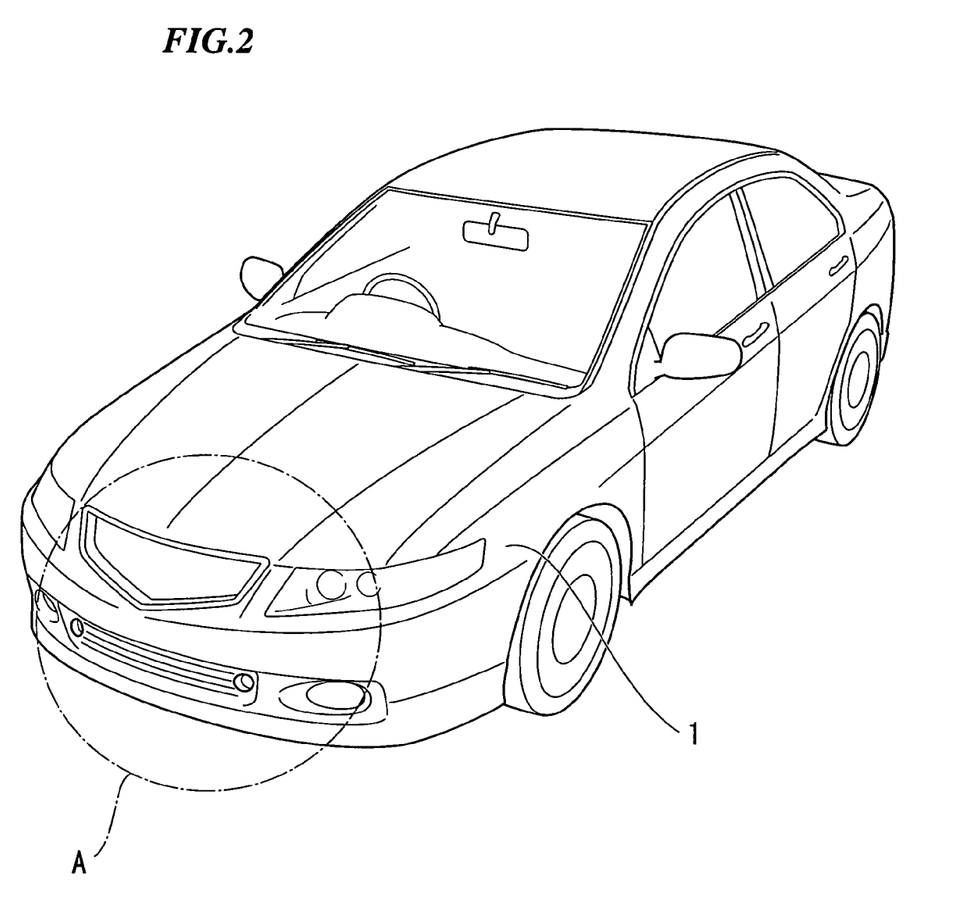
FIG. 2 is a perspective view showing the front part of the vehicle body.
Figure 3:
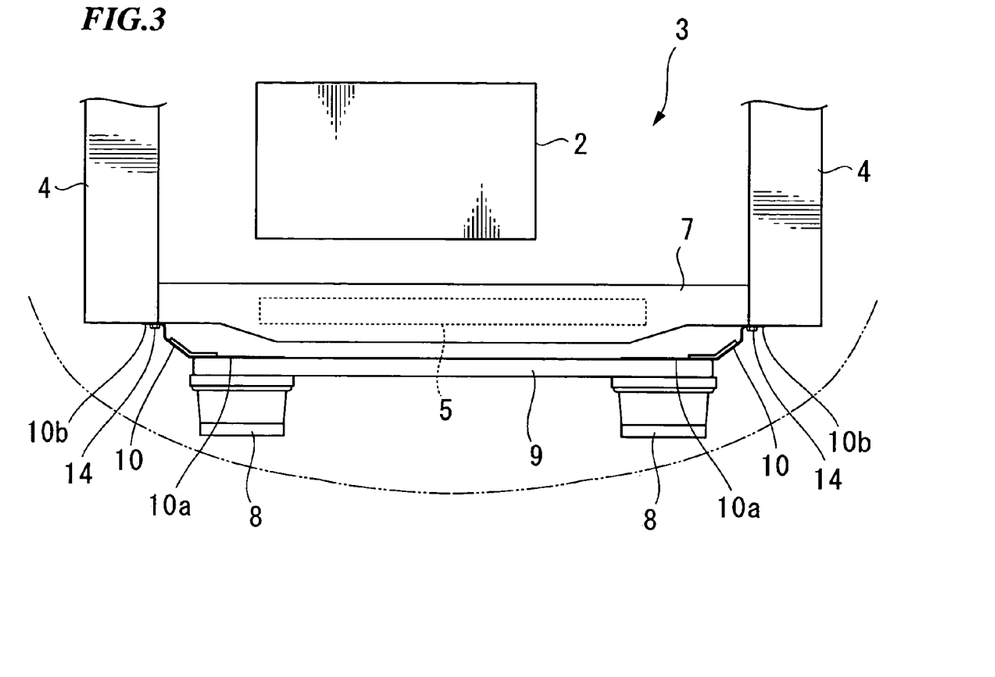
FIG. 3 is a view showing a first embodiment of the invention, and is a plan view briefly showing the framework of a vehicle body.
Figure 4:
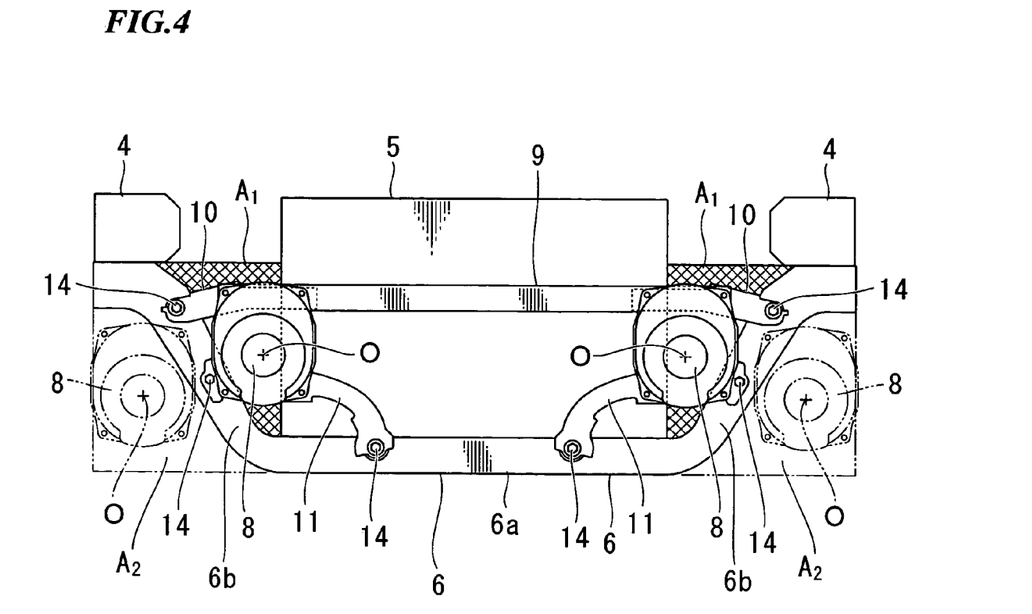
FIG. 4 is a front view briefly showing the framework of a vehicle body.
Figure 5:
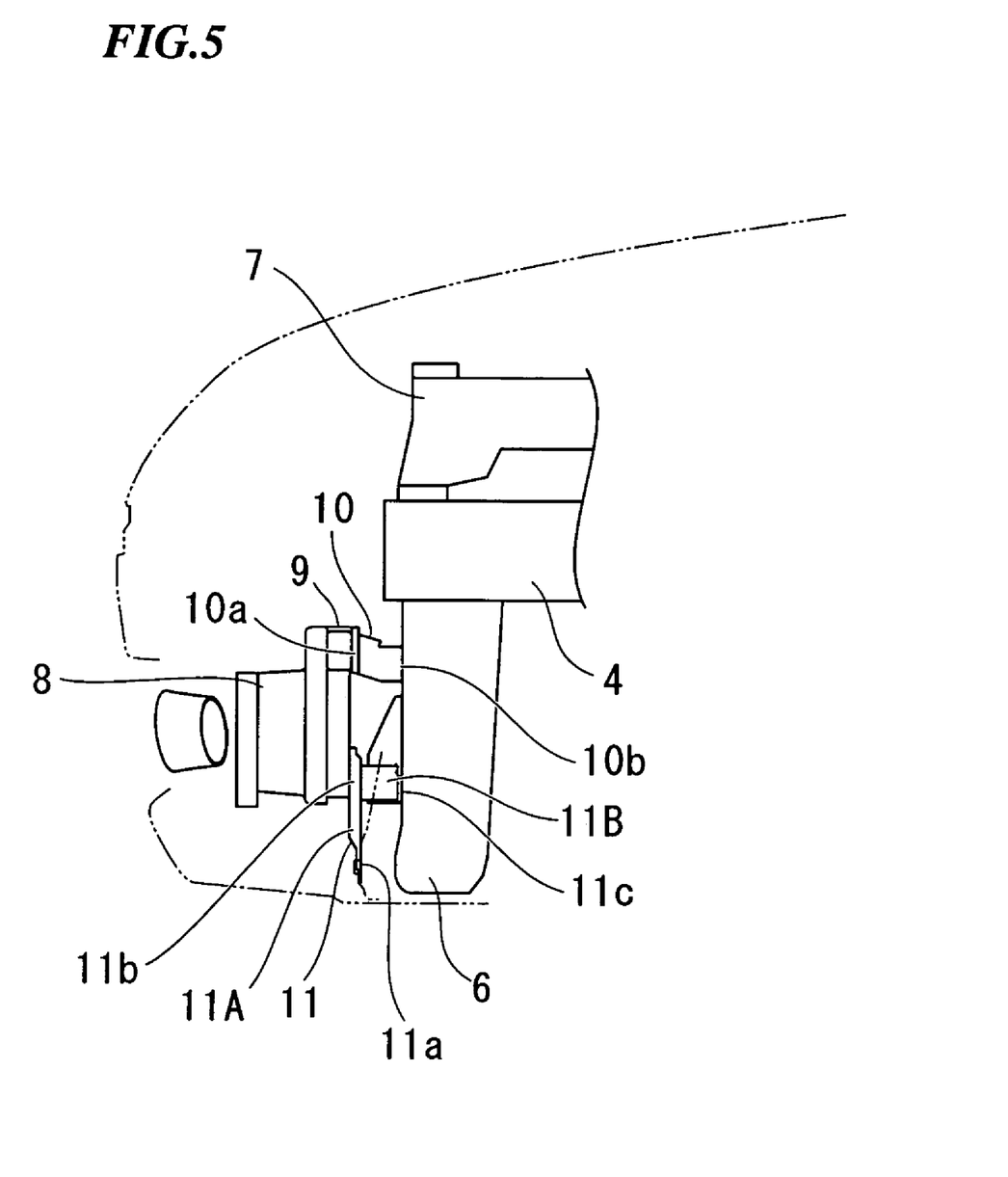
FIG. 5 is a side view briefly showing the framework of a vehicle body.

FIG. 1 is a perspective view showing a state where the framework of a vehicle body is exposed with the body panels and bumper, etc., removed from the front part of the vehicle (the front part A of a vehicle 1 shown in FIG. 2), FIG. 3 is a brief plan view of the same framework, FIG. 4 is a brief front view of the same framework, and FIG. 5 is a brief side view of the same framework. In the drawings, reference numeral 2 denotes an engine, 4 denotes side frames, and 5 denotes a radiator. The side frames 4 are composed as a pair and extend in the longitudinal direction of the vehicle body at both sides of the engine room 3. The radiator 5 cools down the engine coolant.

The front end part of one side frame 4 is linked with the front end part of the other side frame 4 by a bulkhead lower cross member 6 (a cross member that composes the invention, and hereinafter called a "lower cross member 6") and a bulkhead upper frame 7 (hereinafter called an "upper frame 7"). The middle part of the lower cross member 6 in its lengthwise direction supports the lower part of the radiator 5, and the middle part of the upper frame 7 in its lengthwise direction supports the upper part of the radiator 5. The section of the lower cross member 6 and the section of the upper frame 7 are both shaped to be closed.

The middle part of the lower cross member 6 in its lengthwise direction is curved downward, and the middle part of the upper frame 7 in its lengthwise direction is curved upward, and an air intake space is secured forward of the radiator 5 between the lower cross member 6 and the upper frame 7. In detail, for example, both ends of a member base portion 6a of the lower cross member 6 are bent diagonally upwardly toward the side frames 4 with respect to the member base portion 6a horizontally extending in the vehicle width direction (herinafter called a "side inclined portion 6b"), and respective terminal ends of the side inclined portions 6b of the lower cross member 6 are further bent outward in the vehicle width direction, and are linked with the lower surfaces of the respective side frames 4.

A far-infrared camera 8 (hereinafter called a "camera 8") is employed as a stereoscopic camera installed in the vehicle. Two cameras 8 are provided so as to be composed as a pair. The respective cameras 8 are linked with each other by a lateral stay 9 extending in the vehicle width direction, and are attached to the lower cross member 6 via an upper bracket 10 and a lower bracket 11.

Figure 6:
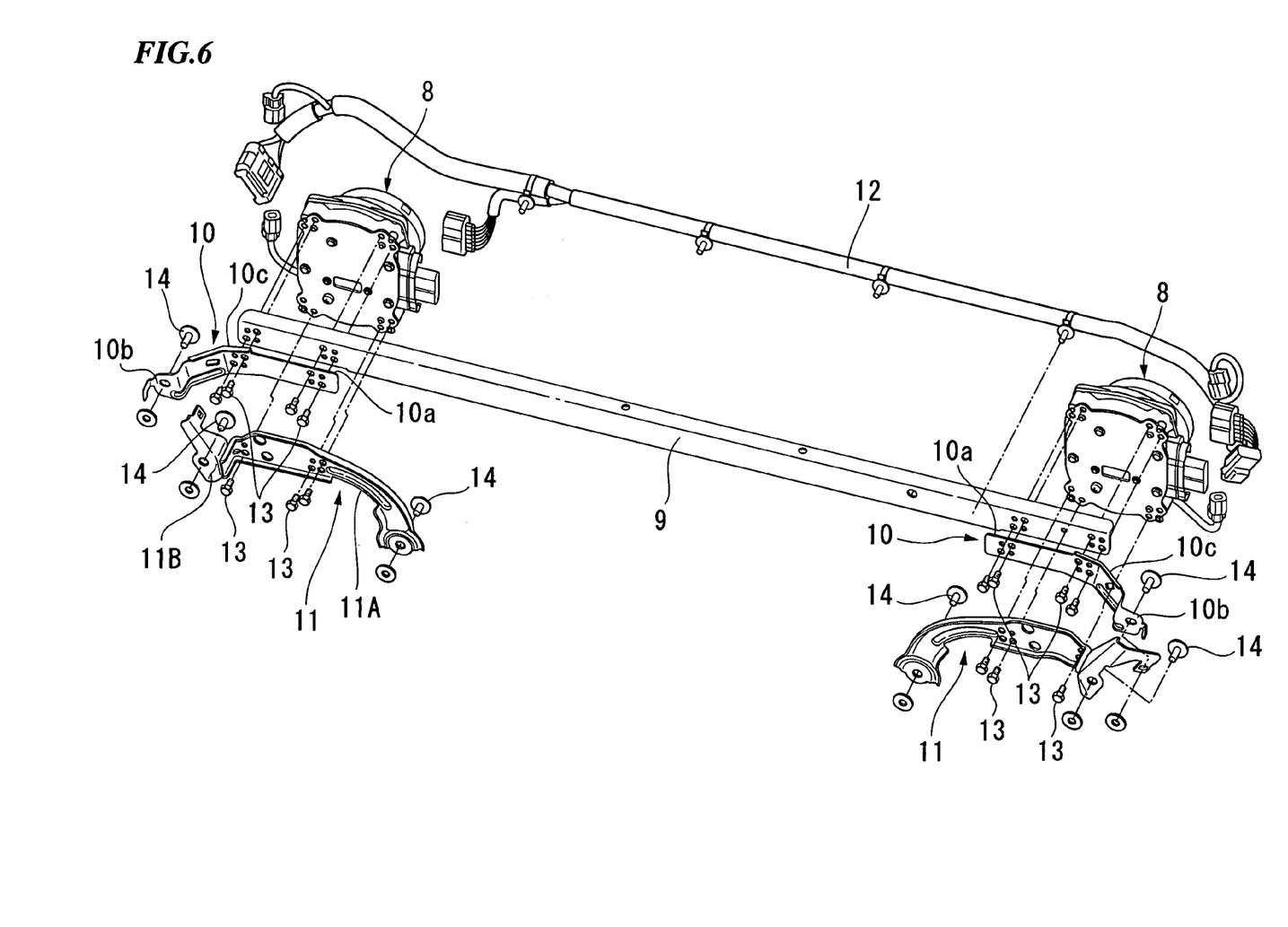
FIG. 6 is a disassembled perspective view of the framework of a vehicle body.

As shown in FIG. 1 and FIG. 6, the lateral stay 9 is formed generally as an elongated bar with first and second plate members integrally attached to one another so as to form an angle therebetween, and is made of metal such as aluminum, iron, etc. Alternatively, the lateral stay 9 may be provided as a generally tubular member having a substantially square cross-sectional shape. The front part wall and the lower part wall at both side edges of the lateral stay 9 are notched, and the upper edges of the rear parts of the respective cameras 8 are fixed on the front side of the remaining rear part wall. Also, a bundle of signal cables 12, connected to both the cameras 8, is fixed at the intermediate part of the lateral stay 9 in its lengthwise direction, using clips.

Figure 7:
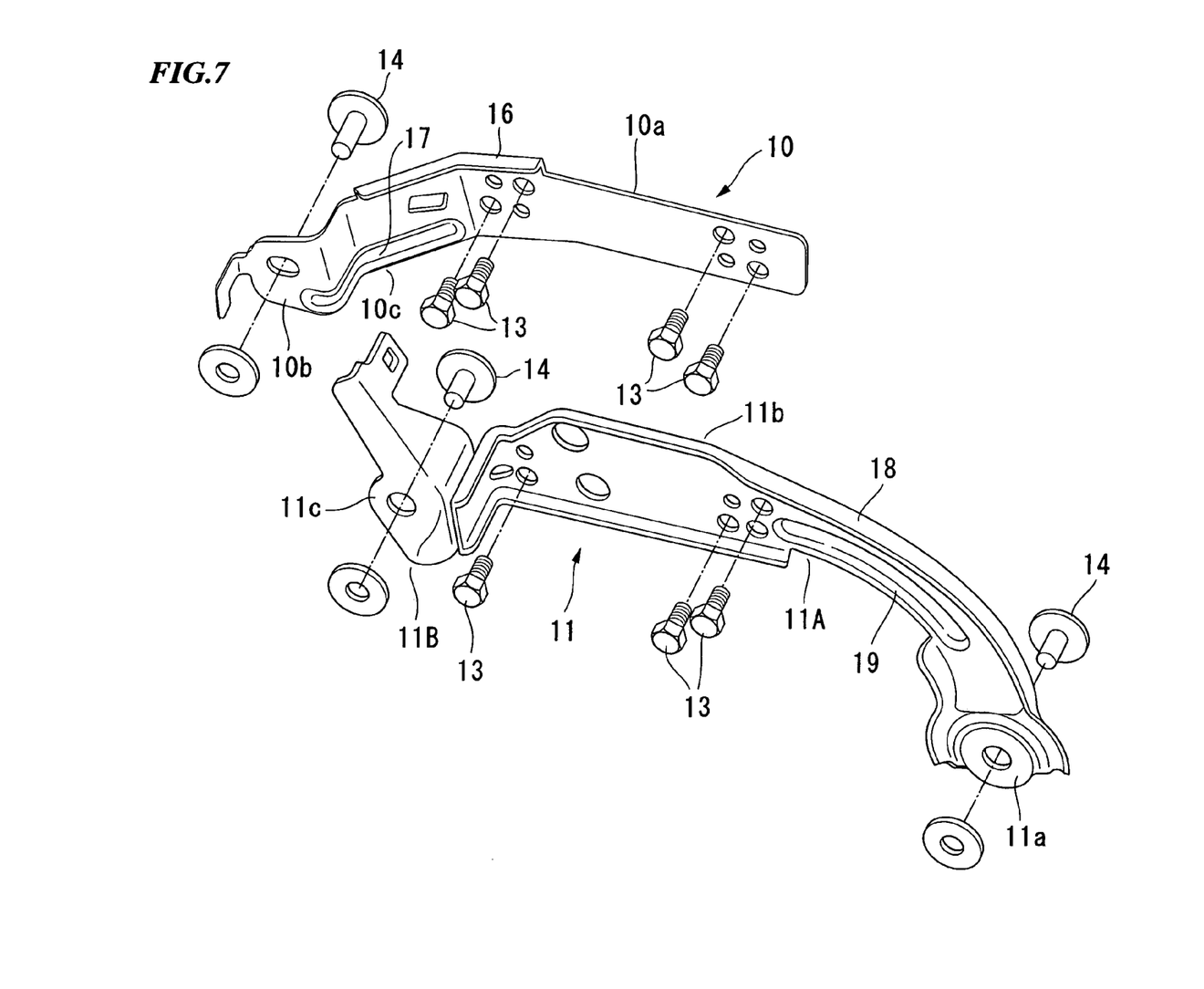
FIG. 7 is an exploded perspective view showing some of the components shown in FIG. 6.

As shown in FIG. 6 and FIG. 7, the upper bracket 10 and the lower bracket 11 are formed of metal such as aluminum, etc. The upper edges of the rear part of the respective cameras 8 are fixed at the side inclined portion 6b (Refer to FIG. 4) of the lower cross member 6 via the lateral stay 9 and the upper bracket 10. The rigidity of the entirety or a part of the upper bracket 10 is lower than the bending rigidity of the lateral stay 9. Further, the rigidity of the entirety or a part of the lower bracket 11 is lower than the bending rigidity of the lateral stay 9.

The upper bracket 10 is formed, as shown in FIG. 7, by folding down a band-shaped metal plate at a plurality of points. An attaching plane 10a to the camera is provided at the front side of one end part of the upper bracket 10, and a plane 10b to be attached to the vehicle body is provided at the rear side of the other end part of the upper bracket 10. As shown in FIG. 6, one end part of the upper bracket 10 at which the attaching plane 10a to the camera is disposed, is tightened to the upper edge of the camera 8 by bolts 13 along with the end part of the lateral stay 9. The other end part of the upper bracket 10 at which the plane 10b to be attached to the vehicle body is disposed, is tightened at the vicinity of the upper part of the side inclined portion 6b of the lower cross member 6 (Refer to FIG. 4).

In addition, in the present embodiment, the upper bracket 10 is folded down at three points, and the respective points are a folded portion 10c to increase the amount of deformation of the upper bracket 10. A reinforcement flange 16 is bent and formed at one side edge of the upper bracket 10 along its lengthwise direction so that it extends over the end edge of the attaching plane 10a to the camera and a part of the folded portion 10c. A reinforcement bead 17 is formed at the other side edge of the upper bracket 10 so that it extends over the end edge of the plane 10b to be attached to the vehicle body and a part of the folded portion 10c. In the embodiment, the entirety of the upper bracket 10 is press-formed.

The lower bracket 11 is composed of a bracket body 11A and a sub-bracket 11B coupled to the bracket body 11A. The bracket body 11A formed by press-forming a large-sized metal plate is formed so as to be roughly circular arc-shaped when being observed from its front side. A first plane 11a to be attached to the vehicle body is provided at the rear side of one end part of the bracket body 11A. The section of the sub-bracket 11B formed by press-forming a metal plate is formed so as to be L-shaped. A second plane 11c to be attached to the vehicle body is provided at the rear side of the bottom wall of the sub-bracket 11B.

As shown in FIG. 4, one end part of the bracket body 11A, at which the first plane 11a to be attached to the vehicle body is provided, is tightened to the member base portion 6a of the lower cross member 6 by bolts 14. An attaching plane 11b to the camera is provided at the front side of the other end part of the bracket body 11A. The terminal of the other end part of the bracket body 11A is roughly orthogonally folded, and the sub-bracket 11B is coupled thereto. The lower edge part of the camera 8 is tightened to the attaching plane 11b to the camera, of the bracket body 11A by bolts 13. The sub-bracket 11B is tightened to a roughly intermediate position of the side inclined portion of the lower cross member 6. In addition, a reinforcement flange 18 and a reinforcement bead 19 are suitably formed on the bracket body 11A of the lower bracket 11.

Meanwhile, when observing the camera 8 from forward of the vehicle body, which is fixed on the lower cross member 6 via the lateral stay 9 and the brackets 10 and 11 as described above, the center "o" of the camera 8 is positioned in a roughly V-shaped area A1 between the side inclined portion 6b of the lower cross member 6 and the radiator 5 as shown in FIG. 4. The area A1 is offset sideways with respect to the front side of the radiator 5 and is in proximity to the side frame 4, which is a major framework member of the vehicle and has sufficient strength and rigidity.

In the structure for attaching a stereoscopic camera, which is constructed as described above, for example, when both side frames 4 are deformed so as to open outward in the vehicle width direction upon receiving heat from the engine 2, both ends of the lower cross member 6 are pulled outward due to deformation of the side frames 4, and the respective side inclined portions 6b are apt to be deformed outward. At this time, a load acts on the upper bracket 10 and the lower bracket 11 for fixing the camera 8 and the lateral stay 9 on the lower cross member 6.

However, the load can be absorbed by deformation of both the brackets 10 and 11 having a lower rigidity than that of the lateral stay 9. Therefore, no great bending load will act on the lateral stay 9. In particular, in the upper bracket 10 coupled to the vicinity of the upper end of the side inclined portion 6b of the lower cross member 6, low rigidity portions composed of a plurality of bending portions 10c have a great allowance for deflection. Since these portions are deformed with an allowance, a significant load applied from the lower cross member 6 can be effectively absorbed.

Also, since the structure for attaching a stereoscopic camera is basically composed so that both ends of the lateral stay 9 are fixed at the lower cross member 6, being the vehicle frame, via the brackets 10 and 11, it is possible to prevent the camera 8 from any play and swaying. Therefore, in the structure for attaching a stereoscopic camera, the cameras 8 are kept away from each other with regard to the interval therebetween due to the employment of far-infrared cameras whose focal distance is long, and both the cameras 8 are linked with each other by means of the long lateral stay 9. Nevertheless, no inconveniences such as play, sway, etc., of the cameras 8 occur. Further, even if the cameras 8 are disposed forward of the engine room 3 where large vibrations are generated, any inconveniences such as play and swaying, etc., of the cameras 8 do not occur either.

Furthermore, since, in the structure for attaching a stereoscopic camera, the center "o" of the camera 8 is positioned in a roughly V-shaped area A1 formed between the side inclined portion 6b of the lower cross member 6 and the radiator 5, there is no case when the cameras 8 hinder the flow of air into the radiator 5, and to the contrary, the cameras 8 are not influenced by the heat of the radiator 5. Moreover, it is possible to securely fix the camera 8 at the lower cross member 6 positioned in the vicinity of the side frame 4, which is a major framework member. Therefore, according to the embodiment, it is possible to install the cameras 8 at the front grille of a vehicle without any inconvenience.

Also, according to the embodiment, the camera 8 is installed so that the center "o" of the camera 8 is positioned in the roughly V-shaped area A1 between the side inclined portion 6b of the lower cross member 6 and the radiator 5. However, as shown using two-dashed chain lines in FIG. 4, the camera 8 may be installed so that the center "o" of the camera is positioned in an area A2 which is outside the side inclined portion 6b of the lower cross member 6 and is formed immediately below the side frame 4. In this case, the camera 8 does not hinder any flow of air into the radiator 5, and the camera 8 is further less influenced by the heat of the radiator 5 in comparison with the above-described embodiment. In addition, as in the above-described embodiment, it is possible to securely fix the cameras 8 on the lower cross member 6 positioned in the vicinity of the side frame 4.

Figure 8:
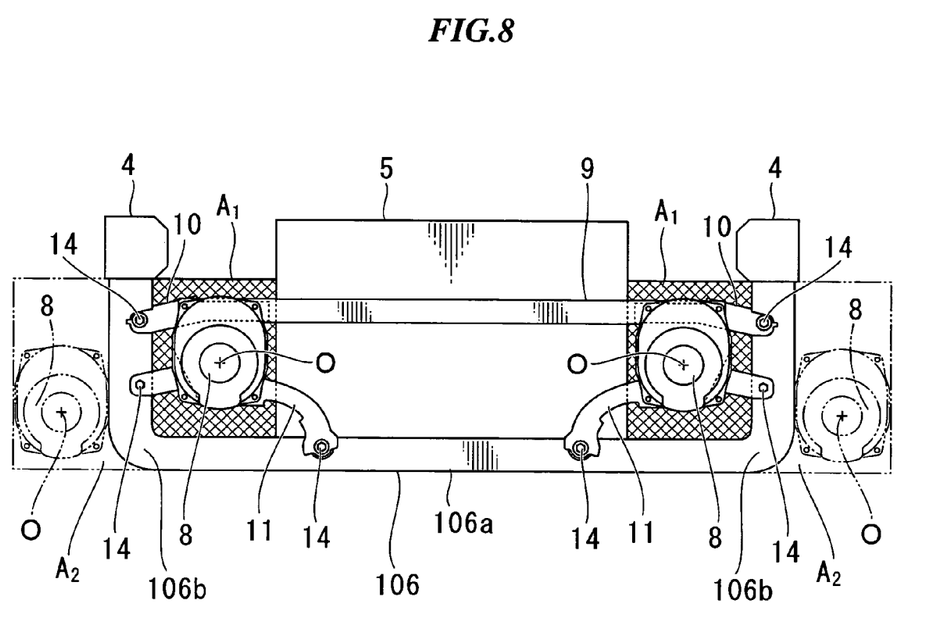
FIG. 8 is a view showing a second embodiment of the invention and is a front view briefly showing the framework of a vehicle body.

FIG. 8 shows a second embodiment of the invention. The basic construction of the embodiment is almost the same as the above-described first embodiment. However, the shape of a lower cross member 106 by which the side members 4 at both sides are coupled to each other is slightly different from that of the first embodiment. That is, a middle member base portion 106a of the lower cross member 106 extends to a position almost immediately below the side frames 4, and end edges 106b at both sides extend from the member base portion 106a perpendicularly upward toward the side frames 4, whereby, in the embodiment, the shape of the area A1 between the end edge 106b of the lower cross member 106 and the radiator 5 is made rectangular. The camera 8 is installed so that the center "o" thereof is positioned in the area A1 as in the above-described first embodiment. With this embodiment, effects similar to those of the above-described first embodiment can be achieved. Also, as shown using two-dashed chain lines in FIG. 8, the camera 8 may be installed so that the center "o" of the camera 8 is positioned in the area A2 in the vicinity of the side frame 4 outside the end edge 106*b* of the lower cross member 106.

FIG. 9, FIG. 10, FIG. 11A and FIG. 11B show a third embodiment of the invention. Also, components already explained in the above-described embodiments are given the same reference numerals, and an overlapping description thereof is omitted.

Figure 9:
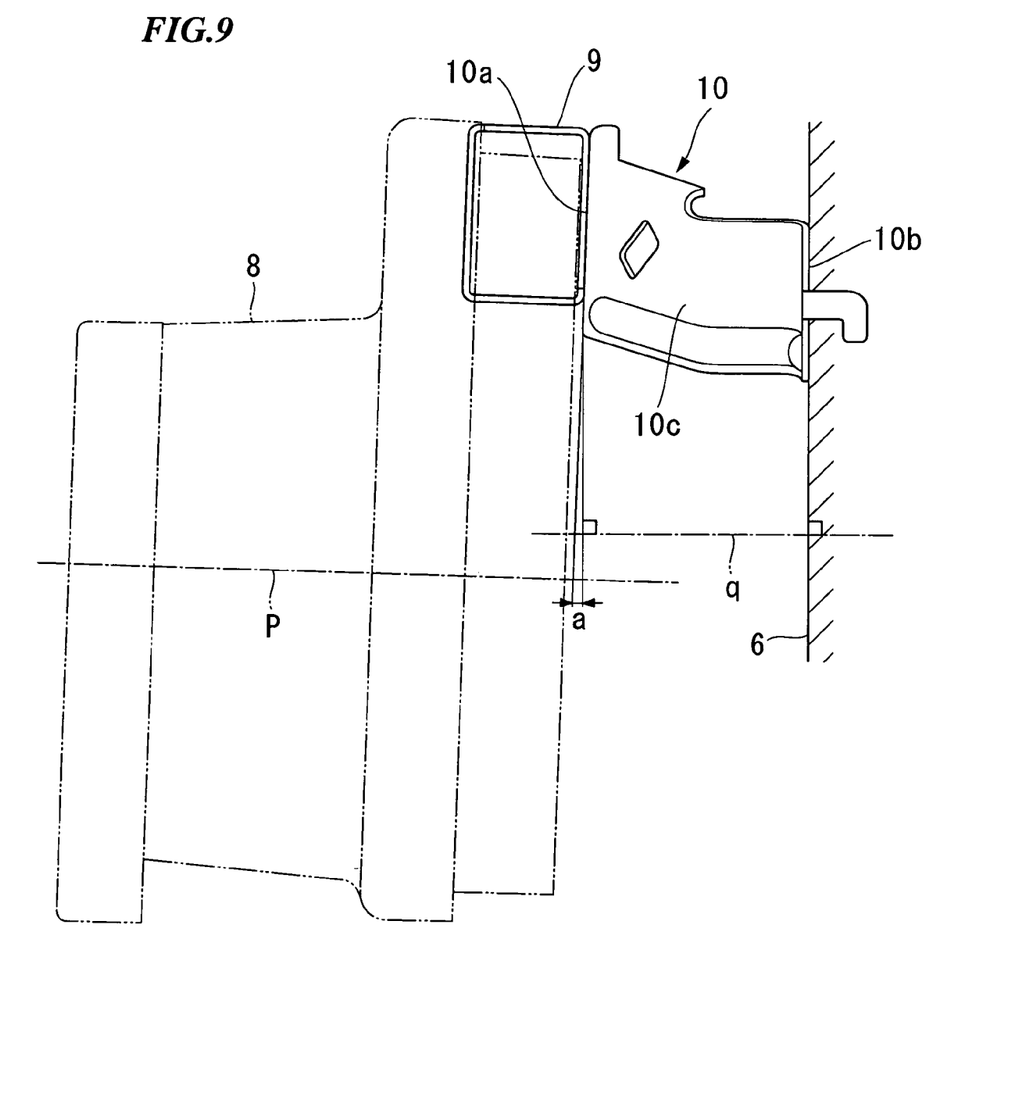
FIG. 9 is a view showing a third embodiment according to the invention, and is a side view showing a state where cameras are installed on the lower cross member via an upper bracket.
Figure 10:
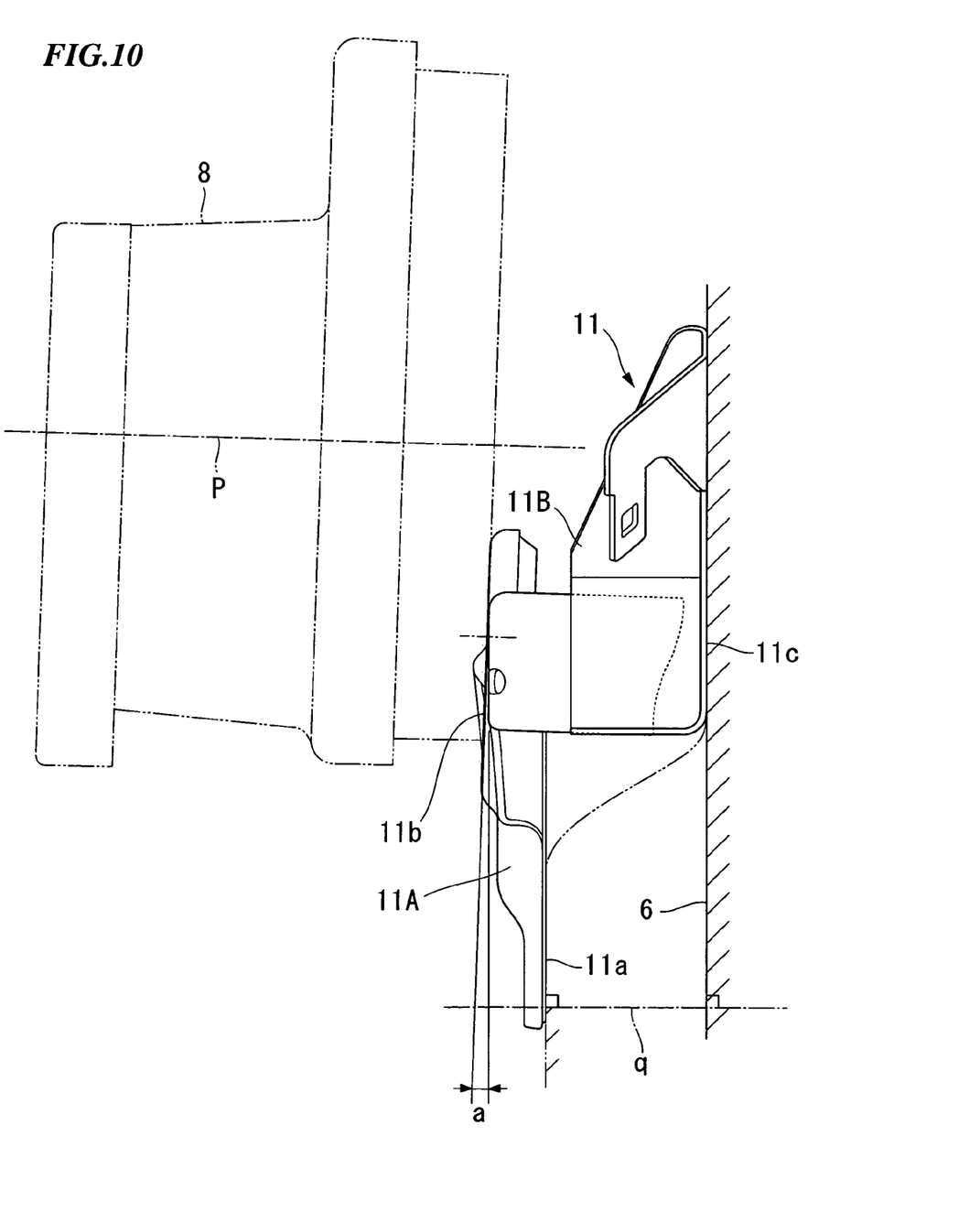
FIG. 10 is a side view showing a state where cameras are installed on the lower cross member via the lower bracket.

The attaching plane 10*a* of the upper bracket 10 to the camera, is not parallel to the plane 10*b* of the upper bracket 10, to be attached to the vehicle body, and the attaching plane 11*b* of the lower bracket 11 to the camera is not parallel to the planes 11*a* and 11*c*, to be attached to the vehicle body, of the lower bracket 11. As shown in FIG. 9, the attaching plane 10*a* to the camera is formed so as to be turned upward at a slight angle "a" with respect to the plane 10*b* to be attached to the vehicle body. In addition, as shown in FIG. 10, the camera-attached plane 11*b* of the lower bracket 11 is formed so as to be turned upward at a slight angle "a" with respect to the planes 11*a* and 11*c*, to be attached to the vehicle body, of the lower bracket 11.

Herein, if the attaching plane 10*a* to the camera, is parallel to the plane 10*b* to be attached to the vehicle body, and the attaching plane 11*b* to the camera, is parallel to the planes 11*a* and 11*c*, to be attached to the vehicle body, of the lower bracket 11, an optical axis p of the camera 8 attached to the lower cross member 6 via the brackets 10 and 11 becomes parallel to an axis q orthogonal to the attaching plane of the lower cross member 6. However, in the structure for attaching a stereoscopic camera, the attaching plane 10*a* to the camera, is inclined upward at a slight angle "a" with respect to the plane 10*b* to be attached to the vehicle body, and the attaching plane 11*b* to the camera is inclined upward only at a slight angle "a" with respect to the planes 11*a* and 11*c* to be attached to the vehicle body. Accordingly, in actuality, the optical axis p of the camera 8 is turned upward only at a slight angle "a" with respect to the axis q.

The slight angle "a" is an angle that is determined based on calculations and experiments, taking into consideration that the front end parts of the side frames 4 drop when heavy devices such as the engine 2, transmission (not illustrated), etc., are supported by the side frames 4. In a state where the side frames 4 support heavy devices, the slight angle "a" is provided so that the optical axis q of the camera 8 is oriented to a targeted angle forward of the vehicle.

Figure 11A:
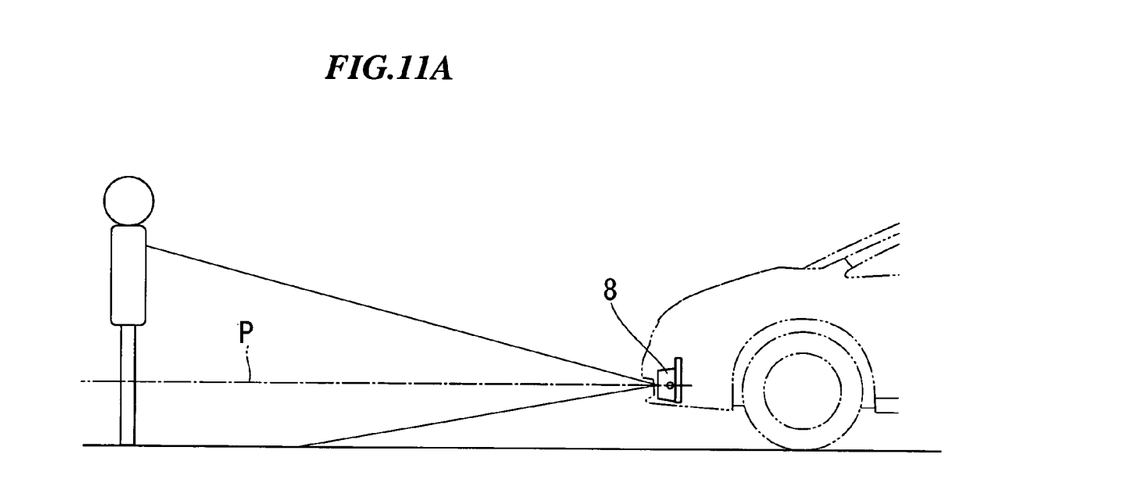
FIG. 11A is a conceptual view showing a photographing state of cameras in a vehicle in which an attaching structure according to the invention is not installed.
Figure 11B:
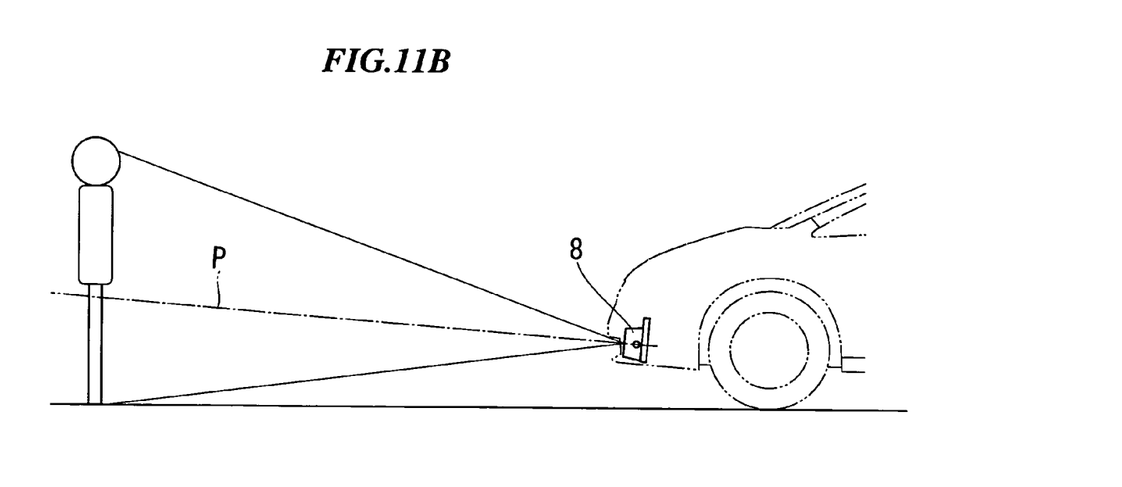
FIG. 11B is a conceptual view showing a photographing state of cameras in a vehicle in which an attaching structure according to the invention is installed.

In the structure for attaching a stereoscopic camera, which is constructed as described above, in a state where the side frames 4 are deformed by heavy devices, it is possible to securely turn the optical axis q of the camera 8 to the optimal angle forward of the vehicle, as shown in FIG. 11B, by attaching the camera 8 to the lower cross member 6 via the lateral stay 9, and the brackets 10 and 11. In this connection, FIG. 11A shows a comparative example in a case when no countermeasure according to the invention is provided. In this comparative example, the optical axis p is turned downward with respect to the center of an object targeted when photographing.

Also, in the structure for attaching a stereoscopic camera, since it is possible to turn the optical axis p of the incorporated cameras 8 to a targeted direction by devising the shape of the upper bracket 10 and the lower bracket 11, it is possible to reduce the entire costs of a camera apparatus mounted in a vehicle, to make the size thereof smaller, and to make it lighter in weight, in comparison with previous cases when the photographing surface of the camera 8 is made wider and a mechanical optical axis adjusting mechanism is employed.

The inclination angle "a" of the attaching plane 10*a* of the upper bracket 10 to the camera to the plane l0*b* to be attached to the vehicle body and the inclination angle "a" of the attaching plane 11*b* to the camera to the planes 11*a* and 11*c*, to be attached to the vehicle body, of the lower bracket 11 are not necessarily the same at the left and right brackets 10 and 11 of the lateral stay 9. In a case when the deformation amounts (degree of dropping) of the front end parts of the side frames 4 resulting from heavy devices differ at the left and right sides of the vehicle body, it is preferable that the inclination angles "a" are established according to the respective deformation amounts. Thereby, it is possible for the optical axes of the two cameras 8 to be turned to further accurate directions.

As described above, preferred embodiments of the invention were explained. However, the invention is not limited to the above-described embodiments. The invention is subjected to addition, omission, replacement and other various modifications within a range not departing from the spirit of the invention. That is, the invention is not limited by the above description, but the invention is limited only by the accompanying claims thereof.

For example, in the above-described first and second embodiments, the camera 8 is installed so that the center "o" of the camera 8 is positioned at either the area A1 between both folded end parts (side inclined portions 6*b* and end edge 106*b*) of the cross member 6 and the radiator 5 or the area A2 in the vicinity of the side frame 4 outside both folded end parts of the cross member 6. However, a part of the camera 8 may be positioned in the above-described areas A1 and A2.

Also, a far-infrared camera is employed as a stereoscopic camera in the above-described respective embodiments. However, the camera is not limited to the far-infrared camera, wherein a camera utilizing visible light may be available.

What is claimed is:

1. A support structure for attaching a stereoscopic camera apparatus in a vehicle having a body frame including two spaced apart side frames and a lower cross member having upwardly extending end portions, and a radiator supported at a middle part of the cross member, said support structure configured and arranged to attach a plurality of cameras of the stereoscopic camera apparatus to the body frame of the vehicle in order to stereoscopically capture images surrounding the vehicle, said support structure comprising:

a lateral stay for coupling the plurality of cameras with each other, the lateral stay extending in a vehicle width direction across a front portion of the vehicle body frame below the side frames; and plural brackets for fixing the lateral stay or the plurality of cameras to the lower cross member having terminal ends connected to front end parts of the side frames at both sides of an engine room, wherein a first camera of the plurality of cameras has a center which is disposed below the lateral stay between a first end of the cross member and the radiator on a passenger's side of the vehicle, and a second camera of the plurality of cameras has a center which is disposed below the lateral stay between a second end of the cross member and the radiator on a driver's side of the vehicle.

2. A support structure for attaching a stereoscopic camera in a vehicle according to claim 1, wherein a plane of the brackets to be attached to the lateral stay or an attaching plane of the brackets to each of the cameras is inclined to a plane of the brackets to be attached to the body frame so that an optical axis of the camera is inclined upward with respect to an axis orthogonal to the plane of the brackets to be attached to the body frame.

3. A support structure for attaching a stereoscopic camera in a vehicle according to claim 2, wherein an angle formed by the plane of the bracket to be attached to the lateral stay and the plane of the bracket to be attached to the body frame or an angle formed by the attaching plane of the bracket to the camera and the plane of the bracket to be attached to the body frame is established in response to an amount of displacement of the portion of the body frame where the bracket is installed.

4. A support structure for attaching a stereoscopic camera apparatus in a vehicle having a body frame including two spaced apart side frames and a lower cross member having upwardly extending end portions, and a radiator supported at a middle part of the cross member, said support structure configured and arranged to attach a plurality of cameras of the stereoscopic camera apparatus to the body frame of the vehicle in order to stereoscopically capture images surrounding the vehicle, said support structure comprising:

a lateral stay for coupling the plurality of cameras with each other, the lateral stay extending in a vehicle width direction across a front portion of the vehicle body frame below the side frames; and plural brackets for fixing the lateral stay and the plurality of cameras to the lower cross member having terminal ends connected to front end parts of the side frames at both sides of an engine room, wherein a first camera of the plurality of cameras is attached to a first end of the lower cross member below the lateral stay in the vicinity of an outside side frame on a passenger's side of the vehicle, and a second camera of the plurality of cameras is attached to a second end of the lower cross member below the lateral stay in the vicinity of an outside side frame on a driver's side of the vehicle.

5. A support structure for attaching a stereoscopic camera in a vehicle according to claim 4, wherein a plane of the brackets to be attached to the lateral stay or an attaching plane of the brackets to each of the cameras is inclined to a plane of the brackets to be attached to the body frame so that an optical axis of the camera is inclined upward with respect to an axis orthogonal to the plane of the brackets to be attached to the body frame.

6. A support structure for attaching a stereoscopic camera in a vehicle according to claim 5, wherein an angle formed by the plane of the bracket to be attached to the lateral stay and the plane of the bracket to be attached to the body frame or an angle formed by the attaching plane of the bracket to the camera and the plane of the bracket to be attached to the body frame is established in response to an amount of displacement of the portion of the body frame where the bracket is installed.

7. In a vehicle having a frame including two opposed side frame portions, a lower cross member extending between the side frame portions, and an upper frame portion extending between the side frame portions and disposed above the cross member, and a radiator operatively attached to the upper frame portion and to the cross member, the cross member having terminal ends connected to front end parts of the side frames at both sides of an engine compartment, the cross member having the radiator operatively supported on a middle part thereof, the improvement comprising a support structure for attaching a stereoscopic camera assembly to the vehicle, by which a pair of cameras are attached to the frame of the vehicle in order to stereoscopically capture images in an area in front of the vehicle, said support structure comprising:

a lateral stay for coupling the pair of cameras with each other, the lateral stay extending between upper end portions of the cross member below the side frame portions; and plural brackets for fixing the lateral stay and the plurality of cameras to the cross member, wherein a first camera of the plurality of cameras is operatively attached to a first end of the lower cross member in the vicinity of an outside side frame on a passenger's side of the vehicle, and a second camera of the plurality of cameras is operatively attached to a second end of the lower cross member in the vicinity of an outside side frame on a driver's side of the vehicle.

8. The vehicle of claim 7, wherein the plural brackets comprise an arcuate lower bracket for each camera which extends between the lower cross member and a respective camera, and a pair of upper brackets which interconnect respective opposed ends of the lateral stay with the respective terminal ends of the lower cross member.

9. A vehicle including a support structure for attaching a stereoscopic camera to the vehicle according to claim 7, wherein a plane of the brackets to be attached to the lateral stay or an attaching plane of the brackets to each of the cameras is inclined to a plane of the brackets to be attached to the body frame so that an optical axis of the camera is inclined upward with respect to an axis orthogonal to the plane of the brackets to be attached to the body frame.

10. A vehicle including a support structure for attaching a stereoscopic camera to the vehicle according to claim 9, wherein an angle formed by the plane of the bracket to be attached to the lateral stay and the plane of the bracket to be attached to the body frame or an angle formed by the attaching plane of the bracket to the camera and the plane of the bracket to be attached to the body frame is established in response to an amount of displacement of the portion of the body frame where the bracket is installed.

* * * * *